(12) United States Patent
Speroni et al.

(10) Patent No.: US 8,877,888 B2
(45) Date of Patent: Nov. 4, 2014

(54) HIGH-FLOW POLYAMIDES

(75) Inventors: Franco Speroni, Ceriano Laghetto (IT); Damien Zaher, Casalpusterlengo (IT)

(73) Assignee: Rhodia Operations, Aubervilliers (FR)

( * ) Notice: Subject to any disclaimer, the term of this patent is extended or adjusted under 35 U.S.C. 154(b) by 110 days.

(21) Appl. No.: 13/499,271

(22) PCT Filed: Sep. 28, 2010

(86) PCT No.: PCT/EP2010/064355
§ 371 (c)(1),
(2), (4) Date: Jun. 13, 2012

(87) PCT Pub. No.: WO2011/039183
PCT Pub. Date: Apr. 7, 2011

(65) Prior Publication Data
US 2012/0245282 A1    Sep. 27, 2012

(30) Foreign Application Priority Data
Sep. 30, 2009   (FR) ..................... 09 56789

(51) Int. Cl.
| | | |
|---|---|---|
| *C08G 69/36* | (2006.01) | |
| *C08G 69/14* | (2006.01) | |
| *C08G 69/26* | (2006.01) | |
| *C08L 77/02* | (2006.01) | |
| *C08L 77/06* | (2006.01) | |

(52) U.S. Cl.
CPC .................. *C08G 69/36* (2013.01); *C08L 77/06* (2013.01); *C08L 77/02* (2013.01)
USPC ........... 528/324; 524/607; 528/338; 528/339; 528/350

(58) Field of Classification Search
CPC ......... C08L 77/10; C08L 77/02; C08G 69/08; C08G 69/14
USPC ........................................... 528/324; 524/607
See application file for complete search history.

(56) References Cited

U.S. PATENT DOCUMENTS

| | | | |
|---|---|---|---|
| 6,525,166 B1 | 2/2003 | Di Silvestro et al. | |
| 6,872,800 B1 * | 3/2005 | Bouquerel et al. | 528/310 |
| 2002/0022712 A1 * | 2/2002 | Nijenhuis et al. | 528/310 |
| 2006/0270798 A1 * | 11/2006 | Touraud et al. | 525/178 |

FOREIGN PATENT DOCUMENTS

| | | |
|---|---|---|
| EP | 0408957 A2 | 1/1991 |
| GB | 1455186 | 2/1974 |
| WO | WO 99/64496 A1 | 12/1999 |
| WO | WO 2007/113262 A1 | 10/2007 |

OTHER PUBLICATIONS

International Search Report corresponding to PCT/EP 2010/064355 issued Mar. 3, 2011.

* cited by examiner

*Primary Examiner* — Tae H Yoon
(74) *Attorney, Agent, or Firm* — Dentons US LLP

(57) ABSTRACT

A polyamide modified by a multi-functional compound, and a method for producing said polyamide and compositions comprising same are described. A method for the production of a polyamide comprising linear macromolecular chains and star-shaped macromolecular chains is also described. A resulting polyamide having optimal mechanical and rheological properties in order to (i) improve mould filling speed and quality, and (ii) produce moldable compositions with high filler contents is also described.

10 Claims, No Drawings

HIGH-FLOW POLYAMIDES

CROSS REFERENCE TO EARLIER APPLICATIONS

This application is the U.S. National Stage of PCT/EP 2010/064355 filed Sep. 28, 2010 and designating the United States (published in the French language on Apr. 7, 2011, as WO 2011/039183 A1; the title and abstract were published in English), which claims priority under 35 U.S.C. §119 of FR 0956789, filed Sept. 30 2009 each hereby expressly incorporated by reference in its entirety and each assigned to the assignee hereof.

The invention relates to a polyamide modified by a multifunctional compound and also to a process for the manufacture of said polyamide and to the compositions comprising this polyamide. It relates more particularly to a process for the manufacture of a polyamide comprising linear macromolecular chains and macromolecular chains of star type. The polyamide thus obtained exhibits optimum mechanical and rheological properties for, on the one hand, improving the speed and the quality of filling of the molds and, on the other hand, the preparation of moldable compositions comprising high contents of fillers.

PRIOR ART

Recent years have seen the development of polyamides having a branched structure, in particular of star type, exhibiting a high melt flow. These polyamides can be used in the manufacture of various articles, such as films, yarns, fibers or molded articles, comprising or not comprising fillers. Mention may in particular be made of the star polyamides described by P. J. Flory (JACS, 70, 2709-18, 1948) and those mentioned in international applications WO97/24388 and WO99/64496.

It is thus known to use multifunctional compounds to increase the flow and the mechanical properties of polyamides of AB type, such as PA6.

There existed a need to obtain polyamides of this type exhibiting a much better compromise between rheological and mechanical properties, in the presence or in the absence of reinforcing or bulking fillers, which are easy to prepare, with very good control of the growth and the concentration of the star chains during the polymerization.

To this end, the invention provides a modified polyamide, comprising linear macromolecular chains and macromolecular chains of star structure, capable of being obtained by polycondensation of at least one mixture of monomers comprising at least:

a) monomers of the following general formula (I):

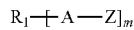

(I)

b) monomers of the following general formulae (IIa) and (IIb):

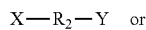 (IIa)

 (IIb)

c) monomers of the following general formula (III):

 (III)

in which:
R₁ is a linear or cyclic, aromatic or aliphatic, hydrocarbon radical which comprises at least two carbon atoms and which can comprise heteroatoms,
A is a covalent bond or an aliphatic hydrocarbon radical comprising 1 to 6 carbon atoms,
Z represents a primary amine radical or a carboxyl group,
R₂ and R₃, which are identical or different, represent substituted or unsubstituted aliphatic, cycloaliphatic or aromatic hydrocarbon radicals which comprise from 2 to 20 carbon atoms and which can comprise heteroatoms,
Y is a primary amine radical when X represents a carboxyl radical, or
Y is a carboxyl radical when X represents a primary amine radical, and
m is an integer between 3 and 8.

The molar concentration of the monomers of formula (I) in the mixture of monomers is between 0.01 and 1%, preferably between 0.03 and 0.5%, the remainder to 100% corresponding to the monomers of general formulae (IIa) and (IIb).

The molar ratio of the monomers of formula (I) to the monomers of formula (III) is between 0.01 and 0.4.

The concentration of the monomers of formula (III) is preferably between 0.1 and 2%, more preferably between 0.2 and 1%, the remainder to 100% corresponding to the monomers of general formulae (IIa) and (IIb).

The polymerization reaction is advantageously carried out until the maximum degree of polymerization is obtained, optionally in the presence of a polycondensation initiator.

Under these conditions, the process of the invention makes it possible to obtain, in a reliable and industrial manner, a polymer comprising a concentration of chains of star type which is optimum for the mechanical and rheological properties desired. Thus, this concentration by number of polyamide chains of star type is advantageously between 0.5 and 35%, preferably between 1 and 30%, with respect to the total number of polyamide chains.

The polycondensation is carried out according to processing conditions normally used for the polycondensation of amino acids or lactams, without polyfunctional compounds of formula (I). This polycondensation can be carried out continuously, batchwise or semicontinuously.

The polyamide polycondensation process generally comprises:
heating the mixture of the monomers of formulae (I) to (III), with stirring and under pressure, with the polycondensation initiator, generally water,
maintaining the mixture at this temperature for a predetermined period of time and then decompressing and maintaining under a stream of inert gas, for example nitrogen, for a predetermined period of time at a temperature greater than the melting point of the mixture, in order thus to continue the polycondensation by removal of the water formed.

The molar concentration of linear chains or chains of star type is determined by the ratio of the difunctional compounds of formula (III) to the multifunctional compounds of formula (I). The polymerization is in particular carried out until thermodynamic equilibrium is reached.

Of course, the molar concentration of chains of star type is also determined by the molar concentration of multifunctional monomer of formula (I) in the mixture of monomers.

Furthermore, the molecular weight of the polymer is determined by the molar concentration of the multifunctional monomers of formula (I) and of the difunctional monomers of formula (IIa) or (IIb).

The model for calculating the concentration of chains of star type used is the Farina model described in application WO99/64496. This model is a static model which takes into consideration only and exclusively all the linear chains and all the chains of star type present in the final polymer.

The polymerization process is a dynamic process in which, before achieving complete conversion of the polymer, the reaction medium comprises a mixture of molecular chains of different types, such as those corresponding to a reaction with one, two or three functional groups of the polyfunctional monomer. Thus, in the case of a tetracarboxyl monomer, the reaction medium comprises chains in which one, two or three carboxyl-functional groups are not reacted.

The model proposed by Yuan, described in application WO99/64496, takes into consideration the presence of these various molecular chains and the dynamic change in the latter. Thus, with this model, it is possible to calculate the true amount of linear chains in the polymer for any degree of conversion.

The process of the invention thus makes it possible to obtain a polyamide of predetermined molecular weight by determination of the molar concentration of the multi-functional monomers of formula (I) and difunctional monomers of formula (III) in the mixture of monomers and with a star-type chain/linear chain ratio by number controlled by the molar ratio between these two types of monomers, for a polymerization carried out until thermodynamic equilibrium of the reaction is achieved.

Thus, the process for the manufacture of the polyamides comprising a mixture of chains of star type and of linear chains can easily be carried out and makes it possible to manufacture, reproducibly and industrially, polyamides exhibiting the desired optimum rheological and mechanical properties.

Furthermore, as the polyamide in accordance with the invention exhibits a higher melt flow index than known linear polyamides, for similar molecular weights and mechanical properties, the filler-comprising composition can be injected more easily into a mold, that is to say at higher rates. The composition also makes it possible to obtain more homogeneous and complete filling of the molds, in particular when the latter have a complex shape.

According to the invention, the monomer of general formula (I) comprises a radical $R_1$ which can advantageously be a trivalent radical of phenyl or cyclohexanyl type, which may or may not be substituted, tetravalent diaminopolymethylene radicals with a number of methylene groups advantageously of between 2 and 12, such as the radical originating from EDTA (ethylene-diaminetetraacetic acid), octavalent cyclohexanonyl or cyclohexadinonyl radicals, for radicals originating from compounds resulting from the reaction of polyols, such as glycerol, sorbitol, mannitol or pentaerythritol, with acrylonitrile. The preferred radicals $R_1$ of the invention are cycloaliphatic radicals, such as the tetravalent cyclohexanonyl radical.

The radical A is preferably a methylene or polymethylene radical, such as the ethylene, propylene or butylene radicals.

According to a preferred embodiment of the invention, the letter m represents an integer greater than 3, advantageously equal to 4, 5 or 6.

According to another characteristic of the invention, the radical $R_3$ of general formula (III) represents polymethylene radicals which can comprise from 2 to 36 carbon atoms or cycloaliphatic or aromatic radicals.

Mention may be made, by way of example, as compound of formula (III), of succinic acid, adipic acid, terephthalic acid, isophthalic acid, sebacic acid, azelaic acid, dodecanoic acid or di(β-carboxyethyl)cyclohexanone. Mention may also be made of diamine compounds, such as hexamethylenediamine, 5-methylpentamethylendiamine, meta-xylylenediamine, isophoronediamine or 1,4-diaminocyclohexane.

The monomers of formula (II) are advantageously lactams or amino acids, such as ε-caprolactam, lauryllactam and their ω-amino acid.

According to the invention, the polycondensation is carried out in the presence of a polycondensation initiator conventionally used in the synthesis of polyamides by polycondensation of a lactam or of an amino acid, such as the synthesis of polycaproamide. Mention may be made, by way of example, of water and inorganic acids. This initiator is advantageously added at a concentration by weight in the mixture of monomers of between 0.01 and 5% by weight.

The polymer emerging from polycondensation can be shaped as granules, after optionally mixing with other components, in order to be used as starting materials in the feed for shaping processes. For example, the polymer is advantageously cooled with water and extruded in the form of rods. These rods are subsequently cut up in order to produce the granules.

In order to remove uncondensed monomers, particularly in the case where the monomer of formula (IIb) is caprolactam, the granules are washed with water and then dried under vacuum.

The present invention also relates to a composition comprising at least the polyamide of the invention.

The composition according to the invention preferably exhibits from 20 to 95% by weight of polyamide according to the invention, preferably from 30 to 80% by weight, with respect to the total weight of the composition.

The composition can also comprise, according to the final property desired, a blend of polyamide and one or more other polymers, such as, for example, another polyamide, polyethylene, polystyrene, polypropylene, ABS resin, polycarbonate, polyphenylene sulfide, polyphenylene oxide, polyacetal, polysulfone, polyethersulfone, polyetherimide, polyetherketone, a polylactic acid resin, a polysulfone resin, an elastomer resin or blends of these. Mention may be made, as other polyamides, of semicrystalline or amorphous polyamides, such as aliphatic polyamides, semiaromatic polyamides and, more generally, linear polyamides obtained by polycondensation between an aromatic or aliphatic saturated diacid and an aliphatic or aromatic saturated primary diamine, a lactam, an amino acid or a mixture of these various monomers. Mention may be made, by way of example, of poly(hexamethylene adipamide), the polyphthalamides obtained from terephthalic and/or isophthalic acid, such as the polyamide sold under the trade name Amodel, or the copolyamides obtained from adipic acid, hexamethylenediamine and caprolactam.

The composition can comprise reinforcing or bulking fillers, which can, for example, be fibrous fillers and/or nonfibrous fillers.

Mention may be made, as fibrous fillers, of glass fibers, carbon fibers, natural fibers, aramid fibers and nanotubes, in particular carbon nanotubes. Mention may be made, as natural fibers, of hemp and flax. Mention may in particular be made, among nonfibrous fillers, of all exfoliable or nonexfoliable nanofillers and/or lamellar particulate fillers, such as alumina, carbon black, aluminosilicate clays, montmorillonites, zirconium phosphate, kaolin, calcium carbonate, diatomaceous earths, graphite, mica, silica, titanium dioxide, zeolites, talc, wollastonite, polymeric fillers, such as, for example, dimethacrylate particles, glass beads or glass powder.

It is perfectly possible according to the invention for the composition to comprise several types of reinforcing fillers. Preferably, the most widely used filler can be glass fibers, such as those of the "chopped" type, in particular having a diameter of between 7 and 14 μm. These fillers can exhibit a surface sizing which provides for mechanical adhesion between the fibers and the polyamide matrix.

The concentration by weight of the reinforcing or bulking fillers is advantageously between 1 and 80% by weight, with respect to the total weight of the composition, preferably between 15 and 60% by weight.

The composition of the invention can additionally comprise additives conventionally used in the manufacture of polyamide compositions. Thus, mention may be made of lubricants, flame retardants, plasticizers, nucleating agents, impact modifiers, catalysts, light and/or heat stabilizers, antioxidants, antistatics, colorants, matifying agents, molding aids or other conventional additives.

It is possible in particular to add, to the polyamide composition, agents which modify the impact strength. It is generally elastomeric polymers which can be used for this purpose, which also make possible a fine dispersion in the polyamide matrix. Typically, the spherical domains of the dispersed elastomers have a mean diameter of less than 1 μm. Examples of suitable elastomers are: ethylene/acrylic ester/maleic anhydride elastomers, ethylene/propylene/maleic anhydride elastomers or EPDM (ethylene/propylene/diene monomer) elastomers with optionally a grafted maleic anhydride. The concentration by weight of elastomer is advantageously between 0.1 and 30%, with respect to the total weight of the composition.

Preference is given in particular to impact modifiers comprising functional groups which react with the polyamide. Mention may be made, for example, of ethylene, acrylic ester or glycidyl methacrylate terpolymers, ethylene and butyl ester acrylate copolymers, ethylene, n-butyl acrylate and glycidyl methacrylate copolymers, ethylene and maleic anhydride copolymers, ethylene/(meth)acrylic acid ionomers, styrene/maleimide copolymers grafted with maleic anhydride, styrene/ethylene/butylene/styrene copolymers modified with maleic anhydride, styrene/acrylonitrile copolymers grafted with maleic anhydrides, acrylonitrile/butadiene/styrene copolymers grafted with maleic anhydrides, and their hydrogenated versions. The proportion by weight of these agents in the overall composition is in particular between 0.1 and 40%.

These fillers and additives can be added to the modified polyamide by normal means suited to each filler or additive, such as, for example, during the polymerization or in melt blending.

The invention also relates to articles obtained by shaping the composition according to the invention. These compositions can be used as starting material in the field of engineered plastics, for example for the production of articles obtained by injection molding, by injection/blow molding, by extrusion or by extrusion/blow molding. According to a normal embodiment, the modified polyamide is extruded in the form of rods, for example in a twin-screw extrusion device, which are subsequently cut up into granules. The molded parts are subsequently produced by melting the granules produced above and feeding the composition in the molten state into injection molding devices.

Such compositions are used to produce articles, in particular molded articles, for the motor vehicle industry, the connector industry, electrical components or accessories for various activities, such as sports activities or leisure activities, for example.

A specific language is used in the description so as to facilitate understanding of the principle of the invention. Nevertheless, it should be understood that no limitation on the scope of the invention is envisaged by the use of this specific language. Modifications and improvements can in particular be envisaged by a person conversant with the technical field concerned on the basis of his own general knowledge.

The term and/or includes the meanings and, or and all the other possible combinations of the elements connected to this term.

Other details or advantages of the invention will become more clearly apparent in the light of the examples given below solely by way of indication.

EXPERIMENTAL PART

Example 1

Synthesis of Polyamides

The polymerization is carried out in a heated autoclave comprising stirring means. Caprolactam and 2,2,6,6-tetra(β-carboxyethyl)cyclohexanone (known as T4), are added to the autoclave with distilled water and adipic acid (known as T2).

The cyclohexanone compound and its process of synthesis are described in the paper "The Chemistry of Acrylonitrile II—Reactions with Ketones", JACS, 64, 2850 (1942), by Herman Alexander Buison and Thomas W. Riener. The stirred mixture is heated to a temperature of 265° C. under 6 bar. It is maintained at this temperature and pressure for 2 hours.

Polyamide C1 corresponds to the polyamide of international application WO97/24388, polyamide C2 corresponds to the polyamide of international application WO99/64496 and polyamide C3 is an unbalanced conventional polyamide having an enhanced flow.

The results and properties of the polyamides obtained are collated in table 1 below:

TABLE 1

|    | Moles T4 | Moles T2 | R = T4/T2 | VN ISO 307 | AEG 3NO502 meq/kg | CEG 3NO502 meq/kg | MFI ASTM 1238 235° C./ 325 g g/10 min |
|----|------|-------|------|-----|----|-----|------|
| C1 | 0.36 | 0 | — | 114 | 23 | 142 | 9.0 |
| C2 | 0.326 | 0.072 | 4.5 | 108 | 32 | 145 | 10.1 |
| 1  | 0.036 | 0.67 | 0.05 | 114 | 30 | 146 | 10.7 |
| C3 | 0 | 0.75 | 0 | 111 | 32 | 140 | 9.8 |

The mechanical properties are mentioned in table 2:

TABLE 2

|    | Notched Izod impact ISO 180-1A kJ/m² | Unnotched Izod impact ISO 180-1U kJ/m² | Tensile strength ISO 527 N/mm² | Modulus ISO 507 N/mm² |
|----|------|------|----|------|
| C1 | 5.1 | 42.2 | 61 | 2770 |
| C2 | 5.2 | 52 | 65 | 2740 |
| 1  | 5.6 | 136 | 78 | 2840 |
| C3 | 4.7 | 46 | 62 | 2770 |

Example 2

Filler-Comprising Polyamide Compositions

Compositions comprising a polyamide matrix are given glass fibers as a filler by melt blending in a twin-screw extruder of Werner and Pfleiderer ZSK 40 type comprising 9 barrels with L/D=36. Thus, compositions comprising 30% or 50% by weight of glass fibers are produced with the polyamides mentioned above. The extrusion temperature is between 230 and 260° C. and the rotational speed of the screw is 270. Extrusion throughput is 40 kg/h. The glass fiber is fed into the molten polymer by introduction in zone 4.

The properties of these compositions are collated in tables 3 and 4 below.

TABLE 3

(30% glass fibers)

| | Notched Charpy impact ISO 179 kJ/m² | Unnotched Charpy impact ISO 179 kJ/m² | Tensile strength ISO 527 N/mm² | Modulus ISO 507 N/mm² | Spiral (cm) |
|---|---|---|---|---|---|
| C1 | 11.4 | 71.9 | 181 | 10 100 | 39 |
| C2 | 11.0 | 66.5 | 180 | 9810 | 40 |
| 1 | 12.4 | 79.6 | 183 | 10 920 | 47 |
| C3 | 8.4 | 42 | 152 | 9600 | 47 |

TABLE 4

(50% glass fibers)

| | Notched Charpy impact ISO 179 kJ/m² | Unnotched Charpy impact ISO 179 kJ/m² | Tensile strength ISO 527 N/mm² | Modulus ISO 507 N/mm² | Spiral (cm) |
|---|---|---|---|---|---|
| C1 | 14.3 | 84 | 212 | 15 000 | 31 |
| C2 | 14.9 | 82 | 216 | 15 200 | 32 |
| 1 | 16.6 | 86 | 227 | 16 500 | 33 |
| C3 | 13.2 | 75 | 204 | 15 400 | 32 |

The spiral test consists in injecting the composition into a mold in the form of a spiral with a thickness of 1 mm and a width of 40 mm under a Battenfeld press of 180 tonnes at a temperature of 270° C., a mold temperature of 80° C. and an injection pressure of 80 kg/cm². The injection time is 1.5 seconds. The result of the test is determined by the mold length correctly filled with the composition.

It is thus observed that the polyamides according to the invention exhibit a much better compromise between mechanical and rheological properties with respect to the polyamides of the prior art, in the absence or in the presence of reinforcing or bulking fillers, while being simple to prepare.

The invention claimed is:

1. A polyamide obtained by the polycondensation of a mixture of:

a) monomers of the following general formula (I):

$$R_1 \!\!-\!\!\!+\!\! A \!-\! Z]_m \qquad (I)$$

b) monomers of the following general formulae (IIa) and (IIb):

$$X-R_2-Y \quad \text{or} \qquad (IIa)$$

$$R_2 \underset{NH}{\overset{O}{\underset{\|}{\overset{\|}{\bigvee}}}} C \qquad (IIb)$$

and c) monomers of the following general formula (III):

$$Z-R_3-Z \qquad (III)$$

in which:

$R_1$ is a linear or cyclic, aromatic or aliphatic, hydrocarbon radical which comprises at least two carbon atoms and which can comprise heteroatoms, A is a covalent bond or an aliphatic hydrocarbon radical comprising 1 to 6 carbon atoms, Z is a primary amine radical or a carboxyl group, $R_2$ and $R_3$, which are identical or different, are each aliphatic, cycloaliphatic or aromatic hydrocarbon radicals which comprise from 2 to 20 carbon atoms and which can comprise heteroatoms, X is a carboxyl radical or a primary amine radical; and Y is a primary amine radical when X is a carboxyl radical, or Y is a carboxyl radical when X is a primary amine radical, m is an integer ranging from 3 to 8, the molar concentration of the monomers of formula (I) in the mixture of monomers of general formulae (I), (IIa) and (IIb) being from 0.01% to 1%, and the molar ratio of the monomers of formula (I) to the monomers of formula (III) being from 0.01 to 0.4, and the molar concentration of monomers of formula (III) is from 0.1% to 2% in the mixture of monomers (III), (IIa), and (IIb).

2. The polyamide as defined by claim 1, wherein the concentration by number of polyamide chains of star is from 0.5% to 35%, with respect to the total number of polyamide chains.

3. The polyamide as defined by claim 1, wherein the radical $R_1$ is a cyclohexanoyl radical.

4. The polyamide as defined by claim 1, wherein $R_3$ is a polymethylene radical comprising from 2 to 36 carbon atoms.

5. The polyamide as defined by claim 1, wherein the compound of formula (III) is selected from the group consisting of: succinic acid, adipic acid, terephthalic acid, isophthalic acid, sebacic acid, azelaic acid, dodecanoic acid, di(β-carboxyethyl)cyclohexanone, hexamethylenediamine, 5-methylpentamethylendiamine, meta-xylylenediamine, isophoronediamine and 1,4-diaminocyclohexane.

6. The polyamide as defined by claim 1, wherein the monomer of formula (IIb) is ε-caprolactam.

7. A composition comprising at least one polyamide as defined by claim 1.

8. A composition comprising from 20% to 95% by weight of a polyamide as defined by claim 1, with respect to the total weight of the composition.

9. The composition as defined by claim 7, further comprising reinforcing or bulking fillers.

10. An article obtained by shaping the composition as defined by claim 7.

* * * * *